Aug. 22, 1950   J. L. GRATZMULLER   2,519,563
PACKING RING
Filed Sept. 17, 1947

INVENTOR
Jean Louis Gratzmuller
his ATTY.

Patented Aug. 22, 1950

2,519,563

UNITED STATES PATENT OFFICE 2,519,563

PACKING RING

Jean Louis Gratzmuller, Paris, France

Application September 17, 1947, Serial No. 774,493
In Belgium July 15, 1947

1 Claim. (Cl. 309—34)

The invention refers to packing rings and more particularly to piston packing rings of the type presenting in their active position a U- or V-shaped transversal section.

In piston packing rings of this type it often happens that a portion of the active edge of the outer lip, cooperating with the inner wall of the cylinder starts to come off said wall. The pressure, instead of tending to apply this edge tightly against said wall as before this happening, acts then as a liquid wedge tending to increase rapidly the small localized gap or leak thus created between the cylinder and said outer lip and to spread it over the entire periphery of said lip.

It becomes thus very important in the packing rings of this type, to realize a uniform application of the outer lip against the inner wall of the cylinder before application of any pressure on the ring and independently from said pressure. This problem becomes particularly difficult in the case of telescopic hydraulic jacks, where one disposes of a relatively restricted annular space to lodge the packing ring.

The object of the present invention is to realize a packing ring of the U or V above-mentioned types that will not have this defect and the outer lip of which will be constantly and uniformly applied tightly against the inner periphery of the cylinder before the application of pressure and independently of said pressure.

To obtain this result, according to an important feature of the invention, an auxiliary split ring, acting by its own elasticity as a radial centrifugal uniform spring, is forced in the gorge of the main ring so as to press constantly on the inner face of the outer lip of said main ring.

To enhance this result, according to another important feature of the invention, a suitable taper is given to the outer lip of the main ring, i. e. the thickness of this lip is increased from its base to its free annular edge, in order to increase the radial pressure exerted on the inner periphery of the cylinder by this free annular edge under its own elasticity and the action of the split-ring.

Other objects, features and advantages of the invention will become apparent from the reading of the following description of an embodiment of the invention, given as an illustrative example, in reference to the accompanying drawings, in which.

Figure 1:
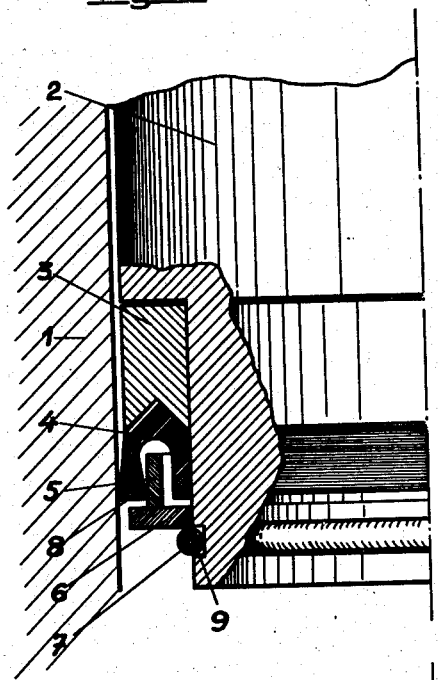
Fig. 1 is a side elevation, with part in radial section of a piston provided with said embodiment of the improved packing ring of the invention, said ring being shown in its active position between said piston and a cylinder merely indicated in section.

Referring to said drawings, one sees in 2 a piston reciprocating in a cylinder 1, 3 indicates a metallic ring guiding the piston in the cylinder, and carrying a plastic or elastic packing ring 4, having a U-shaped or V-shaped transversal section, and secured by adherence or bonded in a V-groove of the guide-ring 3.

In order to apply the free edge 8 of the outer lip of the packing ring 4 tightly against the inner periphery of the cylinder 1, one arranges in the annular gorge of said packing-ring 4 an elastic split-ring or spring 5 having the tendency to exert a radial pressure directed from the interior toward the exterior over the entire inner periphery of the outer lip of the packing ring 4.

This split ring or spring 5 may be held in position in any suitable way, for instance as shown by means of a washer 6 and a piano wire 7, forced into a groove 9 of the piston.

Figure 2:
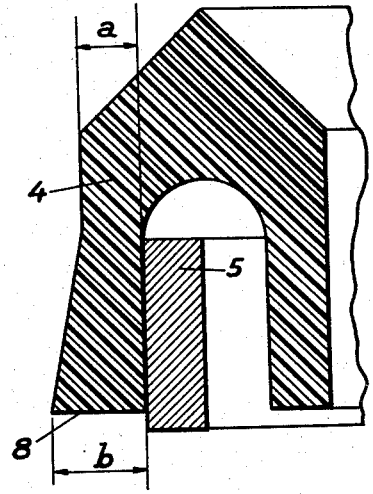
Fig. 2 is an enlarged radial section showing apart the relative position of the main and of the auxiliary rings of said embodiment.
Figure 3:
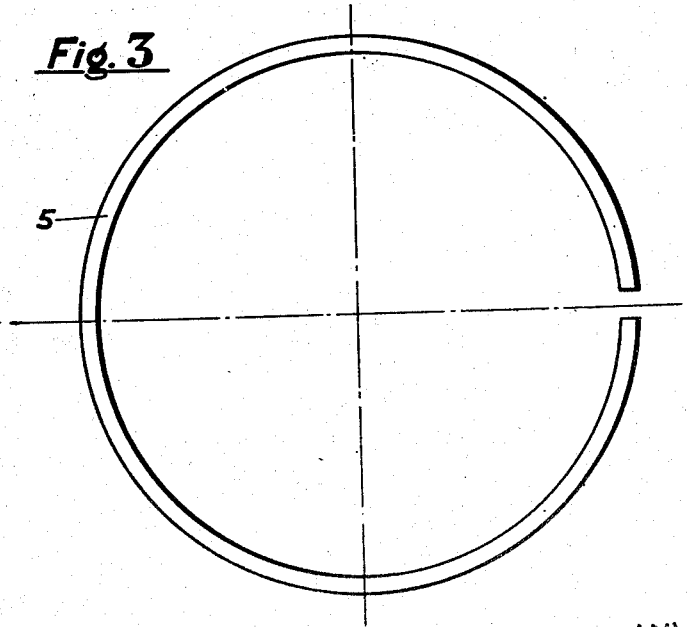
Fig. 3 is a plan view of the auxiliary ring.

According to another characteristic of the invention the radial thickness $b$ of the free annular edge 8 of the outer lip of the packing ring 4 is substantially larger than the radial thickness $a$ of the base of said lip (see Fig. 2). In this way, the elastic split-ring 5 applies the edge 8 against the inner wall of the cylinder (Fig. 1) independently from the pressure acting on the face of the piston shown at the bottom of Figure 1.

Thus, when the pressure is applied, it tends to press this edge 8 of said lip still tighter against the inner wall of the cylinder, and not to detach it from said wall, as would be likely the case were this edge 8 not thus preallably pressed against said wall of the cylinder.

Obviously, the invention is not limited to the embodiment just described and shown in the accompanying drawings and the mounting of the packing, the type of piston, etc. could be different without departing from the spirit and scope of the present invention, as defined in the following claim.

I claim:

In a piston adapted for reciprocation within a cylinder, the improved piston head assembly which comprises, in combination; a cylindrical piston head fitting closely within the interior wall of said cylinder, said piston head being provided, adjacent one end thereof, with a cylindrical extension of diameter less than that of said piston head, said cylindrical extension being provided with an annular groove in the circumferential periphery thereof adjacent the end thereof remote from said portion of said piston head of greater diameter; a ring-shaped metallic element circumferentially positioned around the periphery of said cylindrical extension between said extension and the interior wall of said cylinder, said ring-shaped metallic element being formed with an annular groove positioned circumferentially thereof on the end of said ring-shaped element remote from that portion of said piston head of greater diameter; an annular packing element of U-shaped cross-section positioned in said groove in said ring-shaped element and so disposed with reference to said groove that one leg of the U is in contact with the interior wall of said cylinder, while the other leg of said U is in contact with the circumferential periphery of said cylindrical extension of said piston head; a spring metal expander element of substantially rectangular cross-section positioned within said annular packing element between the legs of the U of said U-shaped cross-section thereof, said expander element acting to exert spring pressure against, and thus force, one leg of said U against the interior wall of said cylinder, thereby insuring a tight fit between said annular packing element and said wall; an annular supporting member for said expander element, said annular supporting member surrounding the periphery of said cylindrical extension and positioned below said spring metal expander element, thereby supporting said element; and a spring retaining member positioned in said annular groove in said cylindrical extension in contact with said annular supporting member, said spring retaining member serving to support said annular supporting member from said extension, and to retain said assembly in place, thereby preventing separation of said supporting member and said spring metal expander element from said piston head assembly.

JEAN LOUIS GRATZMULLER.

REFERENCES CITED

The following references are of record in the file of this patent:

UNITED STATES PATENTS

| Number | Name | Date |
|---|---|---|
| 1,273,737 | Christenson | July 23, 1918 |
| 2,127,290 | Farina | Aug. 16, 1938 |
| 2,168,818 | Condon | Aug. 8, 1939 |